(12) United States Patent
Doemling et al.

(10) Patent No.: US 12,067,790 B2
(45) Date of Patent: Aug. 20, 2024

(54) METHOD AND SYSTEM FOR IDENTIFYING OBJECT

(71) Applicant: Bayerische Motoren Werke Aktiengesellschaft, Munich (DE)

(72) Inventors: Maximilian Doemling, Landshut (DE); Qianshan Li, Shanghai (CN); Wenxin Tian, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 325 days.

(21) Appl. No.: 17/597,100

(22) PCT Filed: Jun. 28, 2019

(86) PCT No.: PCT/CN2019/093596
§ 371 (c)(1),
(2) Date: Dec. 27, 2021

(87) PCT Pub. No.: WO2020/258222
PCT Pub. Date: Dec. 30, 2020

(65) Prior Publication Data
US 2022/0254140 A1 Aug. 11, 2022

(51) Int. Cl.
*G06V 20/56* (2022.01)
*G06V 10/72* (2022.01)
*G06V 10/80* (2022.01)

(52) U.S. Cl.
CPC ............ *G06V 20/588* (2022.01); *G06V 10/72* (2022.01); *G06V 10/803* (2022.01)

(58) Field of Classification Search
CPC .... G06V 20/588; G06V 10/72; G06V 10/803; G06V 10/476; G06V 10/806; G06F 18/253
See application file for complete search history.

(56) References Cited

U.S. PATENT DOCUMENTS

| 2003/0195726 A1 | 10/2003 | Kondo |
| 2006/0034484 A1* | 2/2006 | Bahlmann ............. G06V 10/56 382/104 |

(Continued)

FOREIGN PATENT DOCUMENTS

| CN | 107624155 A | 1/2018 |
| CN | 108573039 A | 9/2018 |

OTHER PUBLICATIONS

International Search Report (PCT/ISA/210) issued in PCT Application No. PCT/CN2019/093596 dated Jun. 30, 2020 (two (2) pages).

(Continued)

*Primary Examiner* — Md K Talukder
(74) *Attorney, Agent, or Firm* — Crowell & Moring LLP

(57) ABSTRACT

A method and an apparatus identifies an object. The method includes at a first time instant, acquiring raw data output by a camera installed on a vehicle, the output raw data comprises one of a continuous data output format for a continuous model or a discrete data output format for a discrete model; feeding the raw data to a discrete statistic model to form discrete statistic model format data for the first time instant, the discrete statistic model format data includes a continuous part having the continuous data output format and a discrete part having the discrete data output format; fusing the discrete statistic model format data for the first time instant with historical discrete statistic model format data to update the discrete statistic model format data for the first time instant; and identifying the object from the updated discrete statistic model format data for the first time instant, wherein the object includes a lanemarking characterized by a curve.

16 Claims, 7 Drawing Sheets

(56) References Cited

U.S. PATENT DOCUMENTS

| | | | |
|---|---|---|---|
| 2017/0060810 A1* | 3/2017 | Preston | G06F 30/15 |
| 2017/0322764 A1 | 11/2017 | Romaen et al. | |
| 2017/0363430 A1 | 12/2017 | Al-Dahle et al. | |
| 2019/0135300 A1* | 5/2019 | Gonzalez Aguirre | G06N 20/00 |
| 2019/0258251 A1* | 8/2019 | Ditty | G06V 20/58 |
| 2022/0254140 A1* | 8/2022 | Doemling | G06F 18/253 |

OTHER PUBLICATIONS

Written Opinion (PCT/ISA/237) issued in PCT Application No. PCT/CN2019/093596 dated Jun. 30, 2020 (three (3) pages).
Extended European Search Report issued in European Application No. 19934456.5 dated Jan. 26, 2023 (six (6) pages).
Ahmed, M. et al.: "Real-Time Lane Detection-Based Line Segment Detection", 2018 New Generation of CAS (NGCAS), IEEE, Nov. 20, 2018 (Nov. 20, 2018), pp. 57-61, XP033472627, DOI: 10.1109/NGCAS.2018.8572124 (five (5) pages).

* cited by examiner

401

{data for $t_{FTI}$}, {data for $t_{FTI-1}$}, {data for $t_{FTI-2}$}, ..., {data for $t_{FTI-n}$} single fusion

402

{data for $t_{FTI-n}$}, {data for $t_{FTI-n+1}$}, {data for $t_{FTI-n+2}$}, ..., {data for $t_{FTI}$} iterative fusion

*FIG. 4*

METHOD AND SYSTEM FOR IDENTIFYING OBJECT

FIELD OF THE INVENTION

The present disclosure relates in general to object identification, and in more particular, to identifying an object by using a discrete statistic model.

BACKGROUND OF THE INVENTION

An automated driving vehicle (also known as a driverless car, self-driving car, robotic car) is a kind of vehicle that is capable of sensing its environment and navigating without human input. Automated driving vehicles (hereinafter, called as ADV) use a variety of techniques to detect their surroundings, such as radar, laser light, GPS, odometry and computer vision. An advanced control system interprets the sensed information to identify appropriate navigation paths, as well as obstacles and related signs.

More specifically, the ADV collects sensor data from various on-board sensors, such as vision-like sensors (eg, camera), radar-like ranging sensors (such as laser radar, millimeter-wave radar, ultrasonic radar), and the like. Camera is typically used to capture real-time images of roads. For example, by processing the real-time image, the lanemarking edge curve can be extracted from the image sequence, thereby identifying the lanemarking. Lanemarking identification is the basis for judging lane departure, and its identification quality will directly affect the timeliness and accuracy of vehicle warning.

Cameras made by different manufacturers can use different formats of data to represent objects. For example, some cameras may use discrete points to represent objects, while others may use polynomial equations to represent objects. Currently, for different data formats, a separate data model needs to be built for storage and processing. There is no model that can support multiple different data formats at the same time.

Furthermore, single frame camera data obtained for a single time instance is unstable and unreliable. It is desirable to fuse camera data for that time instance with multi-frame camera data for previous multiple time instances to fit the data to identify the lanemarking.

Therefore, it is desirable to provide a solution that use a model which can simultaneously support multiple data formats to identify a lanemarking in real time, in order to overcome the aforementioned drawbacks.

SUMMARY OF THE INVENTION

The present disclosure aims to provide a method and an apparatus for identifying an object.

In accordance with a first exemplary embodiment of the present disclosure, a method for identifying an object is provided. The method comprises: at a first time instant, acquiring raw data output by a camera installed on a vehicle, the output raw data comprises one of a continuous data output format for a continuous model or a discrete data output format for a discrete model; feeding the raw data to a discrete statistic model to form discrete statistic model format data for the first time instant, the discrete statistic model format data includes a continuous part having the continuous data output format and a discrete part having the discrete data output format; fusing the discrete statistic model format data for the first time instant with historical discrete statistic model format data to update the discrete statistic model format data for the first time instant; and identifying the object from the updated discrete statistic model format data for the first time instant, wherein the object includes a lanemarking characterized by a curve.

In accordance with a second exemplary embodiment of the present disclosure, an apparatus for identifying an object is disclosed. The apparatus comprising: data acquiring module, the data acquiring module configured to, at a first time instant, acquire raw data output by a camera installed on a vehicle, the output raw data comprises one of a continuous data output format for a continuous model or a discrete data output format for a discrete model; data feeding module, the data feeding module configured to feed the raw data to a discrete statistic model to form discrete statistic model format data for the first time instant, the discrete statistic model format data includes a continuous part having the continuous data output format and a discrete part having the discrete data output format; data fusing module, the data fusing module configured to fuse the discrete statistic model format data for the first time instant with historical discrete statistic model format data to update the discrete statistic model format data for the first time instant; and object identifying module, the curve identifying module configured to identify the object from the updated discrete statistic model format data for the first time instant, wherein the object includes a lanemarking characterized by a curve.

In accordance with a third exemplary embodiment of the present disclosure, a vehicle is provided which comprises one or more cameras, the camera uses one of a continuous model or a discrete model to represent an object, wherein the object includes a lanemarking characterized by a curve; and an apparatus as in the above second exemplary embodiment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

FIG. 4 shows schematic diagrams 401 and 402 for discrete statistic model format data fusion in accordance with one or more embodiments of the present invention.

DETAILED DESCRIPTION

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used through the specification refers to a car, an airplane, a helicopter, a ship, or the like. For simplicity, the invention is described with respect to a "car", but the embodiments described herein is not limited to a "car" only, but applicable to other kinds of vehicles. The term "A or B" used through the specification refers to "A and B" and "A or B" rather than meaning that A and B are exclusive, unless otherwise specified.

Discrete Statistic Model

When a self-driving vehicle is on a road, it is necessary to know the real-time road conditions. To this end, various types of sensors are loaded on the vehicle to act as "eyes" of the vehicle. Currently widely used sensors include vision-like sensors (for example, cameras) and radar-like ranging sensors (such as laser radar, millimeter-wave radar, and ultrasonic radar). Among them, the camera has low cost, can identify different objects, has advantages in object height and width measurement accuracy, lanemarking recognition, pedestrian recognition accuracy, etc., and is an indispensable sensor for implementing lane departure warning and traffic sign recognition.

Figure 1:
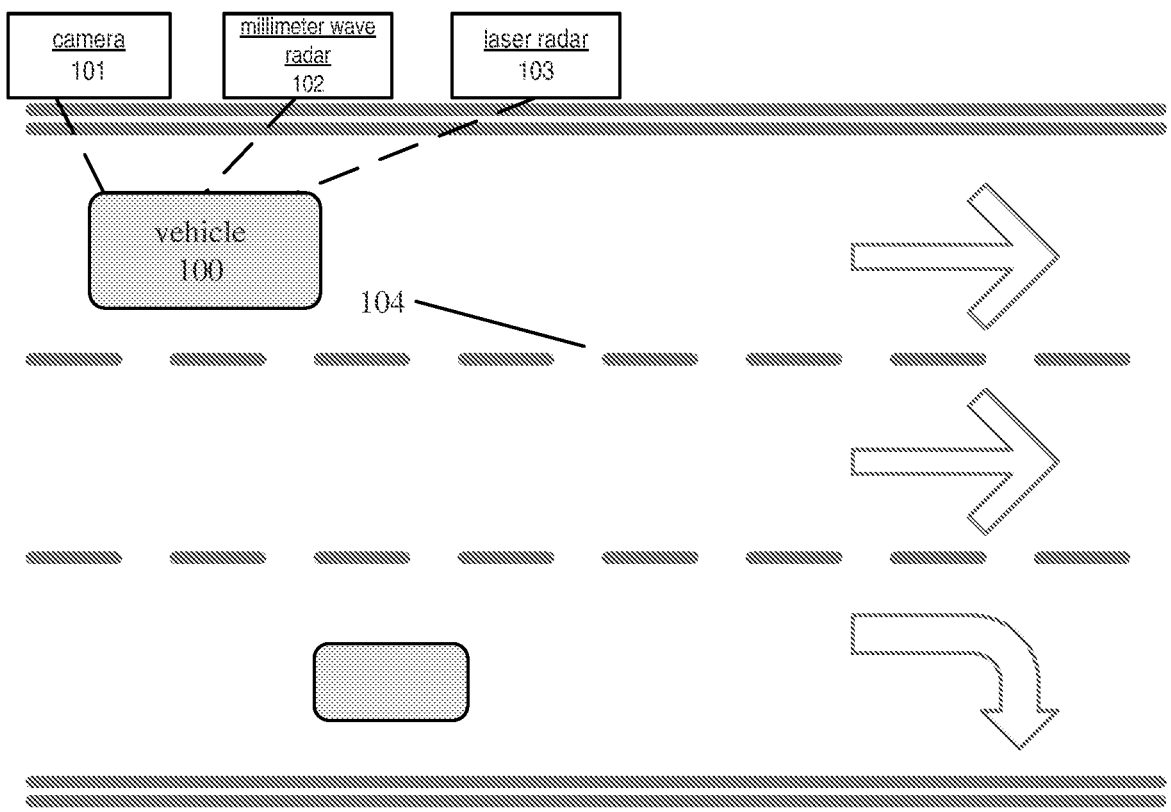
FIG. 1 shows a schematic diagram of automated driving vehicle 100 driving on a road in accordance with one or more embodiments of the present invention.

Referring to FIG. 1, a schematic diagram of an automated driving vehicle 100 driving on a road is shown. Although, for illustrative purposes, the vehicle 100 of FIG. 1 employs a camera 101, a millimeter wave radar 102, and a laser radar 103 to identify an object, those skilled in the art will appreciate that the technical solution of the present invention may employ more or fewer sensors. According to one embodiment of the invention, the object comprises a lanemarking 104. However, it will be fully understood by those skilled in the art that other objects characterized by curves are also within the scope of the present application.

In general, formats of camera data provided by different camera manufacturers are different. Typically, one or more models is used to record sensor data for each format of sensor data. For example, if a vehicle is loaded with cameras from different manufacturers that use different camera data formats, multiple models for different camera data formats need to be predefined, and thus, when processing a large amount of data, there may be a delay in data processing speed due to mutual conversion between data formats. In addition, in practice, there is a high probability that there is a need to replace a pre-installed camera with a camera using a different output format (e.g., the pre-installed camera is damaged, the user has a preference for a certain brand of camera, etc.). In this case, it is necessary to redefine the model for camera data. This is often inconvenient for the user and may cause program problems in later use.

Figure 2:
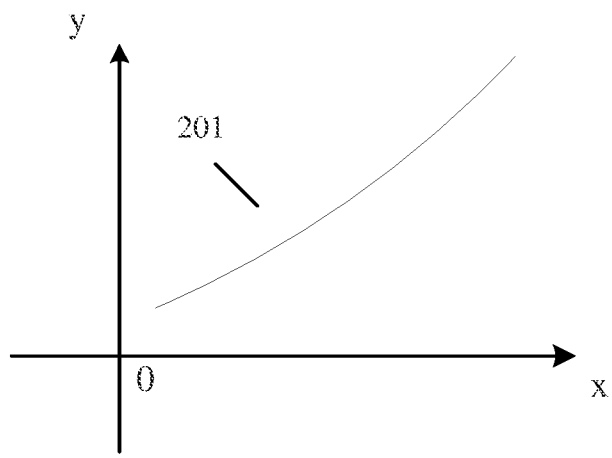
FIG. 2 shows an object 201 represented by the camera using a continuous model and an object 201' represented by the camera using a discrete model in accordance with one or more embodiments of the present invention.
Figure 2:
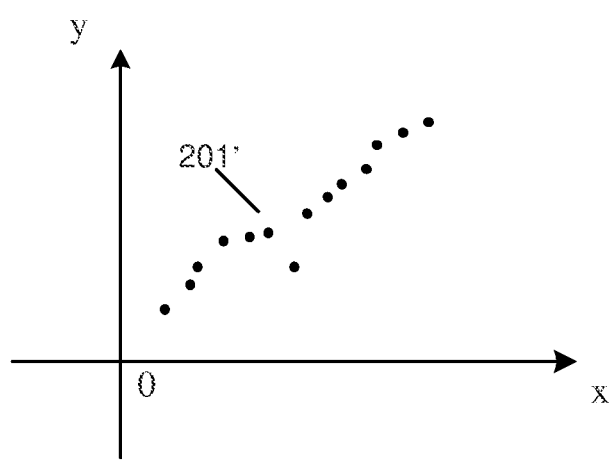

The present invention defines a discrete statistic model that is capable of supporting both continuous and discrete models. The continuous model is used for data in a polynomial format. For example, data in a polynomial format generally describes an object (such as lanemarking 104) with a polynomial equation $y = c_0 + c_1 x + c_2 x^2 + c_3 x^3 + \ldots + c_n x^n$, and the camera uses a continuous model $\{[c_0, c_1, c_2, c_3, \ldots, c_n], [start, end]\}$ to output data in the polynomial format, the output data is considered to have a continuous data output format. Where "start" represents the starting point of the curve depicted by the polynomial equation and "end" represents the ending point of the curve depicted by the polynomial equation. FIG. 2 shows an object 201 represented by the camera using a continuous model.

The discrete model is used for data in a discrete format. For example, discrete format data typically describes an object (such as lanemarking 104) with multiple discrete points, and the camera uses a discrete model $\{(x_1, y_1), (x_2, y_2), \ldots, (x_m, y_m)\}$ to output the data in the discrete format. The output data is considered to have a discrete data output format. FIG. 2 shows an object 201' represented by the camera using a discrete model.

The discrete statistic model of the present invention integrates the above continuous model and discrete model, as the following format: $\{t, [c_0, c_1, c_2, c_3, \ldots, c_n], [start, end], [(x_1, y_1), (x_2, y_2), \ldots, (x_m, y_m)]\}$, which represents the camera data output by the camera at time instance t. Where "$[c_0, c_1, c_2, c_3, \ldots, c_n]$, [start, end]" is the continuous part, "$[(x_1, y_1), (x_2, y_2), \ldots, (x_m, y_m)]$" is the discrete part, The data in these two parts describe the same object.

By using the above discrete statistic model, it is possible to support camera data in two different formats with only one model, thereby making data processing more efficient and reducing the programming pressure that may exist.

Implementations

Figure 3:
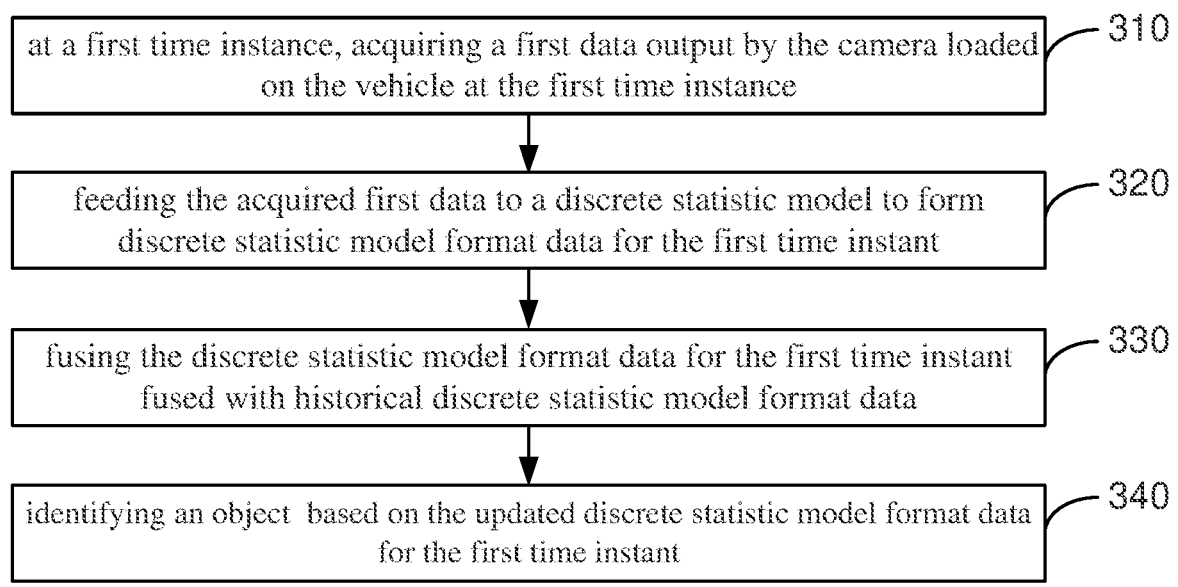
FIG. 3 is a flowchart of an exemplary method 300 for identifying an object in accordance with one or more embodiments of the present invention.

FIG. 3 is a flowchart of an exemplary method 300 for identifying an object. For example, method 300 can be implemented within at least one processor (e.g., processor 704 of FIG. 7), which can be located in an onboard computer system, a remote server, or a combination thereof. Of course, in various aspects of the invention, method 300 can also be implemented by any suitable means capable of performing the associated operations.

The method 300 begins in step 310. At step 310, at a first time instance (in the following description, "first time instance" is understood as "real time"), a first data output by the camera loaded on the vehicle at the first time instance is acquired. The outputted first data has one of a continuous data format for the continuous model described above or a discrete data format for the discrete model described above. That is, the first data uses a polynomial to describe an object or uses discrete points to describe an object.

At step 320, the acquired first data is fed to a discrete statistic model to form discrete statistic model format data for the first time instant. That is, by feeding time information (such as a time stamp, for example, $t_{FTI(first\ time\ instance)}$) and the first data to the discrete statistic model $\{t, [c_0, c_1, c_2, c_3, \ldots, c_n], [start, end], [(x_1, y_1), (x_2, y_2), \ldots, (x_m, y_m)]\}$ to instantiate the discrete statistic model.

According to an embodiment of the present invention, if the first data has a continuous data output format (i.e., $\{[c_0, c_1, c_2, c_3, \ldots, c_n], [start, end]\}$ format), then the first data is used as the continuous part of the discrete statistic model format data by placing the first data into "[$c_0$, $c_1$, $c_2$, $c_3$, ..., $c_n$], [start, end]" part of the discrete statistic model. Next, based on the polynomial corresponding to the first data, a plurality of discrete points on the curve described by the first data are calculated. The number of discrete points calculated can be arbitrary. Those skilled in the art will appreciate that the number of discrete points to be calculated may be selected depending on the processor capabilities of the vehicle. Of course, the number of discrete points to be calculated can also be determined according to other criteria. Next, the calculated discrete points are placed into "[($x_1$, $y_1$), ($x_2$, $y_2$), ..., ($x_m$, $y_m$)]" part of the discrete statistic model as the discrete part of the discrete statistic model format data.

According to an embodiment of the present invention, if the first data has a discrete data output format (i.e., {($x_1$, $y_1$), ($x_2$, $y_2$), ..., ($x_m$, $y_m$)} format), then the first data is used as the discrete part of the discrete statistic model format data by placing the first data into "[($x_1$, $y_1$), ($x_2$, $y_2$), ..., ($x_m$, $y_m$)]" part of the discrete statistic model. Next, a polynomial corresponding to the first data is calculated based on the first data. Those skilled in the art will appreciate that the discrete points can be mathematically processed using interpolation or curve fitting to obtain a curve represented by a polynomial. Next, the calculated polynomial is placed into "[$c_0$, $c_1$, $c_2$, $c_3$, ..., $c_n$], [start, end]" part of the discrete statistic model as the continuous part of the discrete statistic model format data.

As it can be seen, after step 320, the continuous part and the discrete part of the discrete statistic model format data contain data for describing a same object.

At step 330, the discrete statistic model format data for the first time instant is fused with historical discrete statistic model format data to update the discrete statistic model format data for the first time instant. In practice, real-time sensor data acquired at a single time instance does not accurately depict the object. In particular, for objects with continuity, such as lanemarking, etc., fusion of sensor data for multiple consecutive time instances is required to describe the lanemarking.

According to one embodiment of the invention, it is assumed that the camera loaded on the vehicle outputs camera data at certain time intervals. The time interval can be different on demand, such as 0.1 second, 0.2 second, 0.5 second, 1 second, and the like. Of course, other time intervals are also within the scope of the invention. In accordance with one or more embodiments of the present invention, historical discrete statistic model format data may be formed at a number of consecutive time instances prior to the first time instant and stored in a memory of the vehicle or cached for quick reading. As should be understood, the historical discrete statistic model format data has the same data format as the discrete statistic model format data for the first time instance, and is formed at one or more time instances prior to the first time instance in the same manner as the discrete statistic model format data for the first time instant.

According to one embodiment of the invention, after fusion, the discrete part of the fused discrete statistic model format data comprise data of all discrete parts in the plurality of discrete statistic model format data. For example, during fusion, the discrete part of the updated the discrete statistic model format data for the first time instant and all discrete parts in the historical discrete statistic model format data are aggregated. Thus, after fusion, the discrete part of the updated the discrete statistic model format data for the first time instant comprise data of the discrete part of the initial discrete statistic model format data for the first time instant and data of all discrete parts in the historical discrete statistic model format data. According to one embodiment of the invention, considering the computational burden and memory capabilities, during fusion, duplicate data or abnormal data in the aggregated discrete data is removed or filtered. For example, in the discrete part of the updated the discrete statistic model format data for the first time instant, duplicate or outlier discrete points can be removed.

According to one embodiment of the invention, based on the discrete part data of the fused discrete statistic model format data, the continuous data output format data for the curve corresponding to the discrete part data of the fused discrete statistic model format data is computed as the continuous part of the fused discrete statistic model format data. For example, based on the above discrete part of the updated (i.e., fused) discrete statistic model format data for the first time instant, a polynomial corresponding to the updated (i.e., fused) discrete statistic model format data for the first time instant is computed, as the continuous part of the updated (i.e., fused) discrete statistic model format data for the first time instant.

FIG. 4 shows schematic diagrams 401 and 402 for discrete statistic model format data fusion in accordance with one or more embodiments of the present invention. Particularly, the diagram 401 shows a single fusion, while the diagram 402 shows an iterative fusion.

Diagram 401 is a diagram illustrating fusing of the discrete statistic model format data for the first time instant with historical discrete statistic model format data which includes a plurality of discrete statistic model format data for a plurality of previous time instants within a threshold time period prior to the first time instant. That is, {$t_{FTI}$, [$c_0$, $c_1$, $c_2$, $c_3$, ..., $c_n$], [start, end], [($x_1$, $y_1$), ($x_2$, $y_2$), ..., ($x_m$, $y_m$)]} is fused with {$t_{FTI-1}$, [$c_0$, $c_1$, $c_2$, $c_3$, ..., $c_n$], [start, end], [($x_1$, $y_1$), ($x_2$, $y_2$), ..., ($x_m$, $y_m$)]}, {$t_{FTI-2}$, [$c_0$, $c_1$, $c_2$, $c_3$, ..., $c_n$], [start, end], [($x_1$, $y_1$), ($x_2$, $y_2$), ..., ($x_m$, $y_m$)]} {$t_{FTI-n}$, [$c_0$, $c_1$, $c_2$, $c_3$, ..., $c_n$], [start, end], [($x_1$, $y_1$), ($x_2$, $y_2$), ..., ($x_m$, $y_m$)]} for the previous multiple consecutive time instances, to update, {$t_{FTI}$, [$c_0$, $c_1$, $c_2$, $c_3$, ..., $c_n$], [start, end], [($x_1$, $y_1$), ($x_2$, $y_2$), ..., ($x_m$, $y_m$)]}, where "FTI" represents "first time instance". Wherein, the time interval between the two adjacent time instances, for example, between $t_{FTI}$ and $t_{FTI-1}$, can be predetermined as described above, and the threshold time period elapsed between $t_{FTI-n}$ and $t_{FTI}$ may also be selected on demand. For example, in the case where the predetermined time interval is 0.1 second, the threshold time period can be selected to be 1 second, thereby selecting 10 historical general statistical model format data within 1 second prior to the first time instance (i.e., in this case, n is 10) for fusion. After fusing {$t_{FTI}$, [$c_0$, $c_1$, $c_2$, $c_3$, ..., $c_n$], [start, end], [($x_1$, $y_1$), ($x_2$, $y_2$), ..., ($x_m$, $y_m$)]} with multiple previous historical general statistical model format data, {$t_{FTI}$, [$c_0$, $c_1$, $c_2$, $c_3$, ..., $c_n$], [start, end], [($x_1$, $y_1$), ($x_2$, $y_2$), ..., ($x_m$, $y_m$)]} is updated to be {$t_{FTI}$, [$c_0$, $c_1$, $c_2$, $c_3$, ..., $c_n$]', [start, end]', [($x_1$, $y_1$)', ($x_2$, $y_2$)', ..., ($x_m$, $y_m$)']}. Thus, the way of diagram 401 is to update {$t_{FTI}$, [$c_0$, $c_1$, $c_2$, $c_3$, ..., $c_n$], [start, end], [($x_1$, $y_1$), ($x_2$, $y_2$), ..., ($x_m$, $y_m$)]} by fusing {$t_{FTI}$, [$c_0$, $c_1$, $c_2$, $c_3$, ..., $c_n$], [start, end], [($x_1$, $y_1$), ($x_2$, $y_2$), ..., ($x_m$, $y_m$)]} with historical statistic model format data once.

Diagram 402 is a diagram illustrating iteratively fusing of a plurality of statistic model format data for a plurality of previous time instances within a threshold time period prior to the first time instant. Continuing with the above example, it is assumed that the threshold time period is 1 second, and the predetermined time interval between two adjacent time instances is 0.1 second. For a plurality of previous time instances within a threshold time period prior to the first time instant, the following step is iteratively performed until the discrete statistic model format data for the first time instant is updated: fusing discrete statistic model format data for each time instant with discrete statistic model format data for a latter time instant after a predetermined time interval to update the discrete statistic model format data for the latter time instant.

For example, first, $\{t_{FTI-n}, [c_0, c_1, c_2, c_3, \ldots, c_n], [\text{start}, \text{end}], [(x_1, y_1), (x_2, y_2), \ldots, (x_m, y_m)]\}$ is fused with $\{t_{FTI-n}+1, [c_0, c_1, c_2, c_3, \ldots, c_n], [\text{start}, \text{end}], [(x_1, y_1), (x_2, y_2), \ldots, (x_m, y_m)]\}$ to obtain an updated $\{t_{FTI-n+1}, [c_0, c_1, c_2, c_3, \ldots, c_n]', [\text{start}, \text{end}]', [(x_1, y_1), (x_2, y_2), \ldots, (x_m, y_m)]'\}$. Next, $\{t_{FTI-n+1}, [c_0, c_1, c_2, c_3, \ldots, c_n]', [\text{start}, \text{end}]', [(x_1, y_1), (x_2, y_2), \ldots, (x_m, y_m)]'\}$ is fused with $\{t_{FTI-n+2}, [c_0, c_1, c_2, c_3, \ldots, c_n], [\text{start}, \text{end}], [(x_1, y_1), (x_2, y_2), \ldots, (x_m, y_m)]\}$ to obtain an updated $\{t_{FTI-n+2}, [c_0, c_1, c_2, c_3, \ldots, c_n]', [\text{start}, \text{end}]', [(x_1, y_1), (x_2, y_2), \ldots, (x_m, y_m)]'\}$. Next, $\{t_{FTI-n+2}, [c_0, c_1, c_2, c_3, \ldots, c_n]', [\text{start}, \text{end}]', [(x_1, y_1), (x_2, y_2), \ldots, (x_m, y_m)]'\}$ is fused with $\{t_{FTI-n+3}, [c_0, c_1, c_2, c_3, \ldots, c_n], [\text{start}, \text{end}], [(x_1, y_1), (x_2, y_2), \ldots, (x_m, y_m)]\}$ to obtain an updated $\{t_{FTI-n+3}, [c_0, c_1, c_2, c_3, \ldots, c_n]', [\text{start}, \text{end}]', [(x_1, y_1), (x_2, y_2), \ldots, (x_m, y_m)]'\}$. Finally, $\{t_{FTI-1}, [c_0, c_1, c_2, c_3, \ldots, c_n]', [\text{start}, \text{end}]', [(x_1, y_1), (x_2, y_2), \ldots, (x_m, y_m)]'\}$ is fused with $\{t_{FTI}, [c_0, c_1, c_2, c_3, \ldots, c_n], [\text{start}, \text{end}], [(x_1, y_1), (x_2, y_2), \ldots, (x_m, y_m)]\}$ to obtain an updated $\{t_{FTI}, [c_0, c_1, c_2, c_3, \ldots, c_n]', [\text{start}, \text{end}]', [(x_1, y_1), (x_2, y_2), \ldots, (x_m, y_m)]'\}$. Thus, this process can be regarded as "iterative fusion".

Figure 5:
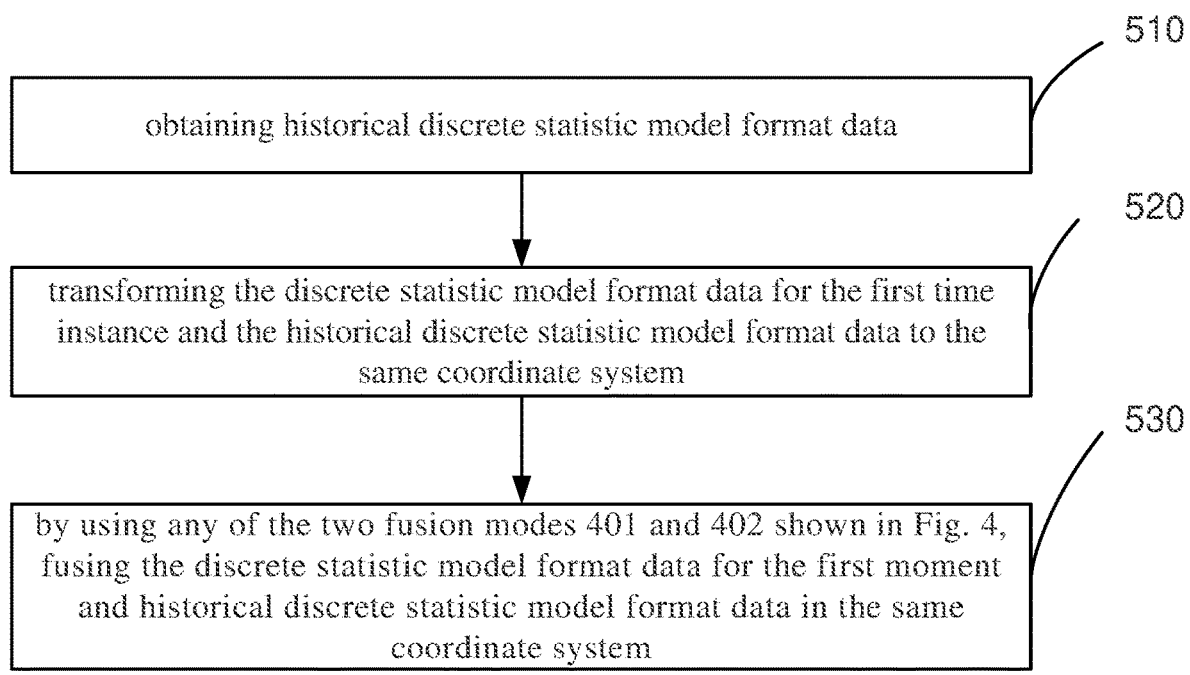
FIG. 5 shows a flow diagram of a method 500 for fusing discrete statistic model format data for a first time with historical discrete statistic model format data in accordance with the embodiment of FIG. 3.

In order to make the fused data more accurate, the following mathematical methods can be used in the fusion. FIG. 5 shows a flow diagram of a method 500 for fusing discrete statistic model format data for a first time with historical discrete statistic model format data in accordance with the embodiment of FIG. 3. At step 510, historical discrete statistic model format data is obtained, the historical discrete statistic model format data including a plurality of discrete statistic model format data for a plurality of previous time instances within a threshold time period prior to the first time instant.

At step 520, the discrete statistic model format data for the first time instance and the historical discrete statistic model format data are transformed to the same coordinate system. For example, assume that the vehicle is the origin of the local coordinate system, the traveling direction of the vehicle is taken as the x-axis of the local coordinate system, and the direction perpendicular to the traveling direction of the vehicle is taken as the y-axis of the local coordinate system. Then, as the vehicle travels a distance L from $t_{FTI-1}$ to $t_{FTI}$ in the direction of traveling, it can be understood that the origin of the local coordinate system at the $t_{FTI}$ is moved (Lx, Ly) as compared with the origin of the local coordinate system at $t_{FTI-1}$. Through the coordinate transformation, all historical discrete statistic model format data is transformed into the local coordinate system at $t_{FTI}$, whereby data for fusion are in the same coordinate system.

According to another embodiment of the present invention, various types of coordinate systems used in historical discrete statistic model format data and used in the discrete statistic model format data for the first time instance can be uniformly transformed into a world coordinate system, thereby making data for fusion are in the same coordinate system. Various coordinate transformation methods include, but are not limited to, translation and rotation of coordinates in a two-dimensional space, translation and rotation of coordinates in a three-dimensional space, and the like.

At step 530, by using any of the two fusion modes 401 and 402 shown in FIG. 4, the discrete statistic model format data for the first moment and historical discrete statistic model format data in the same coordinate system are fused, to update the discrete statistic model format data for the first moment.

In one embodiment, a weighted averaging algorithm may also be employed for the fusion. For example, at the time of fusion, the historical discrete statistic model format data recorded closer to the first time instance is given a higher weight, and the historical discrete statistic model format data recorded farther away from the first time instance is given a lower weight. Of course, other weighting methods can also be conceived.

Returning to FIG. 3, at step 340, an object is identified based on the updated discrete statistic model format data for the first time instant. In one embodiment, a mathematical algorithm can be employed to identify the curve representing a lanemarking from the data having discrete data output format (i.e., discrete points) in the updated discrete statistic model format data for the first time instance, the mathematical algorithm including one of: regression algorithm, interpolation algorithm and fitting algorithm.

Thus, by using the solution of the present invention, by placing different types of data into a unified data model, the data set can be processed more quickly. By using a data model supporting both continuous model and the discrete model of marking, the vehicle system can be compatible with both kinds of cameras. And, historical information has been taken into consideration, the identification of the lanemarking is more accurate.

Figure 6:
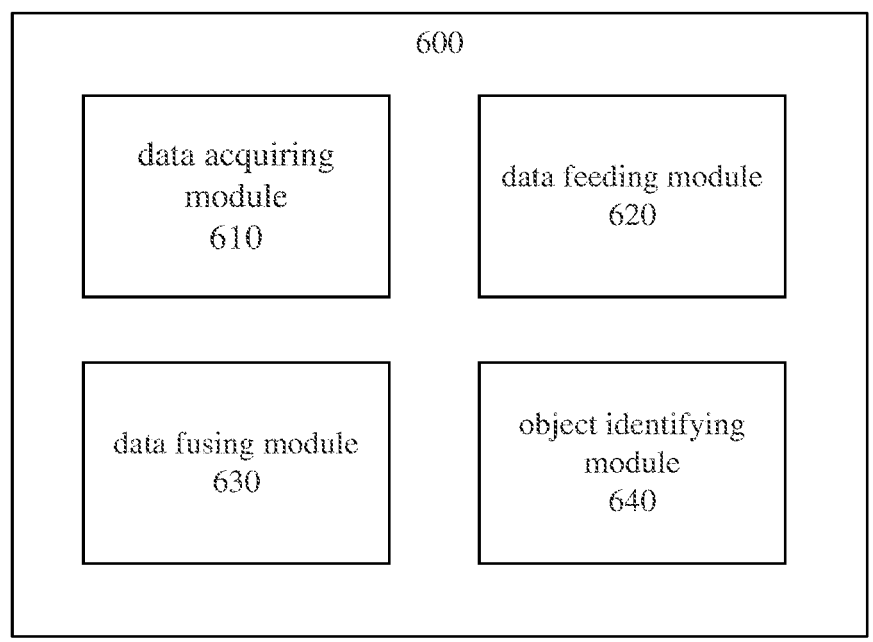
FIG. 6 is a block diagram of an apparatus 600 for identifying an object in accordance with one embodiment of the present invention

FIG. 6 is a block diagram of an apparatus 600 for identifying an object, in accordance with one embodiment of the present invention. All of the functional blocks of apparatus 600 (including the various units in apparatus 600) can be implemented by a combination of hardware, software, hardware, and software. Those skilled in the art will appreciate that the functional blocks depicted in FIG. 6 can be combined into a single functional block or divided into multiple sub-functional blocks.

The apparatus 600 includes data acquiring module 610, the data acquiring module is configured to, at a first time instant, acquire raw data output by a camera installed on a vehicle, the output raw data comprises one of a continuous data output format for a continuous model or a discrete data output format for a discrete model. The apparatus 600 includes data feeding module 620, the data feeding module 620 is configured to feed the raw data to a discrete statistic model to form discrete statistic model format data for the first time instant, the discrete statistic model format data includes a continuous part having the continuous data output format and a discrete part having the discrete data output format. The apparatus 600 includes data fusing module 630, the data fusing module 630 is configured to fuse the discrete statistic model format data for the first time instant with historical discrete statistic model format data to update the discrete statistic model format data for the first time instant. And, the apparatus 600 further includes object identifying module 640, the object identifying module 640 is configured to identify the object from the updated discrete statistic model format data for the first time instant, wherein the object includes a lanemarking characterized by a curve.

Figure 7:
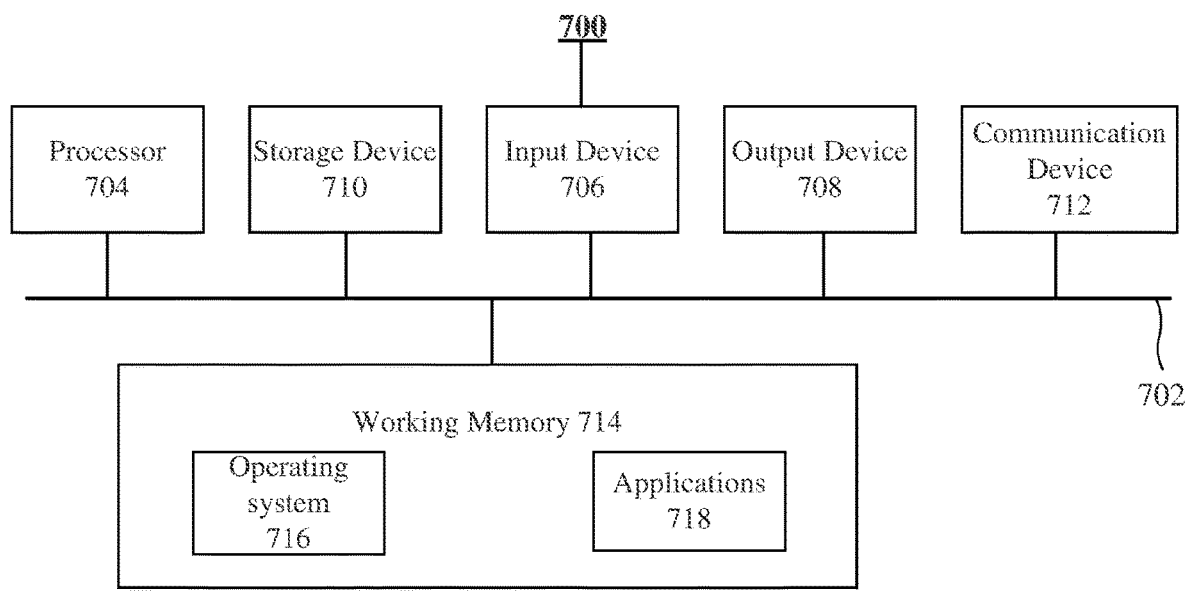
FIG. 7 illustrates a general hardware environment wherein the present disclosure is applicable in accordance with an exemplary embodiment of the present disclosure.

With reference to FIG. 7, a computing device 700, which is an example of the hardware device that may be applied to the aspects of the present disclosure, will now be described. The computing device 700 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned system may be wholly or at least partially implemented by the computing device 700 or a similar device or system.

The computing device 700 may comprise elements that are connected with or in communication with a bus 702, possibly via one or more interfaces. For example, the computing device 700 may comprise the bus 702, and one or more processors 704, one or more input devices 706 and one or more output devices 708. The one or more processors 704 may be any kinds of processors, and may comprise but are not limited to one or more general-purpose processors and/or one or more special-purpose processors (such as special processing chips). The input devices 706 may be any kinds of devices that can input information to the computing device, and may comprise but are not limited to a mouse, a keyboard, a touch screen, a microphone and/or a remote control. The output devices 708 may be any kinds of devices that can present information, and may comprise but are not limited to display, a speaker, a video/audio output terminal, a vibrator and/or a printer. The computing device 700 may also comprise or be connected with non-transitory storage devices 710 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 710 may be detachable from an interface. The non-transitory storage devices 710 may have data/instructions/code for implementing the methods and steps which are described above. The computing device 700 may also comprise a communication device 712. The communication device 712 may be any kinds of device or system that can enable communication with external apparatuses and/or with a network, and may comprise but are not limited to a modem, a network card, an infrared communication device, a wireless communication device and/or a chipset such as a Bluetooth™ device, 802.11 device, WiFi device, WiMax device, cellular communication facilities and/or the like.

When the computing device 700 is used as an on-vehicle device, it may also be connected to external device, for example, a GPS receiver, sensors for sensing different environmental data such as an acceleration sensor, a wheel speed sensor, a gyroscope and so on. In this way, the computing device 700 may, for example, receive location data and sensor data indicating the travelling situation of the vehicle. When the computing device 700 is used as an on-vehicle device, it may also be connected to other facilities (such as an engine system, a wiper, an anti-lock Braking System or the like) for controlling the traveling and operation of the vehicle.

In addition, the non-transitory storage device 710 may have map information and software elements so that the processor 704 may perform route guidance processing. In addition, the output device 706 may comprise a display for displaying the map, the location mark of the vehicle and also images indicating the travelling situation of the vehicle. The output device 706 may also comprise a speaker or interface with an ear phone for audio guidance.

The bus 702 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 702 may also include a Controller Area Network (CAN) bus or other architectures designed for application on an automobile.

The computing device 700 may also comprise a working memory 714, which may be any kind of working memory that may store instructions and/or data useful for the working of the processor 704, and may comprise but is not limited to a random access memory and/or a read-only memory device.

Software elements may be located in the working memory 714, including but are not limited to an operating system 716, one or more application programs 718, drivers and/or other data and codes. Instructions for performing the methods and steps described in the above may be comprised in the one or more application programs 718, and the units of the aforementioned apparatus 800 may be implemented by the processor 704 reading and executing the instructions of the one or more application programs 718. The executable codes or source codes of the instructions of the software elements may be stored in a non-transitory computer-readable storage medium, such as the storage device (s) 710 described above, and may be read into the working memory 714 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Reference has been made throughout this specification to "one example" or "an example", meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for identifying an object, comprising:
at a first time instant, acquiring raw data output by a camera installed on a vehicle, the output raw data comprises one of a continuous data output format for a continuous model or a discrete data output format for a discrete model;
feeding the raw data to a discrete statistic model to form discrete statistic model format data for the first time instant, the discrete statistic model format data includes a continuous part having the continuous data output format and a discrete part having the discrete data output format;
fusing the discrete statistic model format data for the first time instant with historical discrete statistic model format data to update the discrete statistic model format data for the first time instant; and
identifying the object from the updated discrete statistic model format data for the first time instant, wherein the object includes a lanemarking characterized by a curve.

2. The method of claim 1, wherein the continuous model uses a polynomial to describe a curve, the discrete model uses a plurality of discrete points to describe a curve.

3. The method of claim 1, wherein the camera includes one or more of the following: a monocular camera, a binocular stereo vision camera, a panoramic vision camera, and an infrared camera.

4. The method of claim 1, wherein feeding the raw data to a discrete statistic model to form discrete statistic model format data for the first time instant further comprises:
if the raw data has a continuous data output format, using the raw data as the continuous part of the discrete statistic model format data, and calculating a plurality of discrete points on the curve described by the raw data as the discrete part of the discrete statistic model format data; and
if the raw data has a discrete data output format, calculating a continuous data output format for the curve corresponding to the raw data based on the raw data as the continuous part of the discrete statistic model format data, and using the raw data as the discrete part of the discrete statistic model format data.

5. The method of claim 1, wherein fusing the discrete statistic model format data for the first time instant with historical discrete statistic model format data further comprises:
fusing the discrete statistic model format data for the first time instant with historical discrete statistic model format data which includes a plurality of discrete statistic model format data for a plurality of previous time instants within a threshold time period prior to the first time instant, such that the discrete part of the fused discrete statistic model format data comprises data of all discrete parts in the plurality of discrete statistic model format data, and
based on the discrete part data of the fused discrete statistic model format data, computing the continuous data output format data for the curve corresponding to the discrete part data of the fused discrete statistic model format data as the continuous part of the fused discrete statistic model format data.

6. The method of claim 1, wherein fusing the discrete statistic model format data for the first time instant with historical discrete statistic model format data further comprises:
for a plurality of discrete statistic model format data for a plurality of previous time instants within a threshold time period prior to the first time instant, iteratively performing:
fusing discrete statistic model format data for each time instant with discrete statistic model format data for a latter time instant after a predetermined time interval to update the discrete statistic model format data for the latter time instant, until the discrete statistic model format data for the first time instant is updated, such that the discrete part of the fused discrete statistic model format data comprises data of all discrete parts in the plurality of discrete statistic model format data, and
based on the discrete part data of the fused discrete statistic model format data, computing the continuous data output format data for the curve corresponding to the discrete part data of the fused discrete statistic model format data as the continuous part of the fused discrete statistic model format data.

7. The method of claim 5, further comprising:
removing duplicate data from all discrete parts in the plurality of discrete statistic model format data.

8. The method of claim 1, wherein
the fusing further comprises:
using a position of the vehicle at the first time instant as an origin of a local coordinate system to transform the historical discrete statistic model format data into the local coordinate system, such that the historical discrete statistic model format data and the discrete statistic model format data for the first time instant are both represented by the local coordinate system.

9. The method of claim 1, wherein
the fusing further comprises:
transforming different kinds of coordinate systems used in the historical discrete statistic model format data and used in the discrete statistic model format data for the first time instant into a world coordinate system, such that the historical discrete statistic model format data and the discrete statistic model format data for the first time instant are both represented by the same coordinate system.

10. The method of claim 1, wherein
identifying the object from the updated discrete statistic model format data for the first time instant further comprises:
adopting a mathematical algorithm to identify the object from the data having discrete data output format in the updated discrete statistic model format data for the first time instant, the mathematical algorithm including one of: regression algorithm, interpolation algorithm and fitting algorithm.

11. An apparatus for identifying an object, comprising:
a data acquiring module, the data acquiring module configured to, at a first time instant, acquire raw data output by a camera installed on a vehicle, wherein the output raw data comprises one of a continuous data output format for a continuous model or a discrete data output format for a discrete model;
a data feeding module, the data feeding module configured to feed the raw data to a discrete statistic model to form discrete statistic model format data for the first time instant, the discrete statistic model format data includes a continuous part having the continuous data output format and a discrete part having the discrete data output format;

a data fusing module, the data fusing module configured to fuse the discrete statistic model format data for the first time instant with historical discrete statistic model format data to update the discrete statistic model format data for the first time instant; and an object identifying module, the object identifying module configured to identify the object from the updated discrete statistic model format data for the first time instant, wherein the object includes a lanemarking characterized by a curve.

12. The apparatus of claim 11, wherein the data fusing module is further configured to:

if the raw data has a continuous data output format, use the raw data as the continuous part of the discrete statistic model format data, and calculate a plurality of discrete points on the curve described by the raw data as the discrete part of the discrete statistic model format data; and if the raw data has a discrete data output format, calculate a continuous data output format for the curve corresponding to the raw data based on the raw data as the continuous part of the discrete statistic model format data, and use the raw data as the discrete part of the discrete statistic model format data.

13. The apparatus of claim 11, wherein the data fusing module is further configured to:

fuse the discrete statistic model format data for the first time instant with historical discrete statistic model format data which includes a plurality of discrete statistic model format data for a plurality of previous time instants within a threshold time period prior to the first time instant, such that the discrete part of the fused discrete statistic model format data comprises data of all discrete parts in the plurality of discrete statistic model format data, and based on the discrete part data of the fused discrete statistic model format data, compute the continuous data output format data for the curve corresponding to the discrete part data of the fused discrete statistic model format data as the continuous part of the fused discrete statistic model format data.

14. The apparatus of claim 11, wherein the data fusing module is further configured to:

for a plurality of discrete statistic model format data for a plurality of previous time instants within a threshold time period prior to the first time instant, iteratively perform the following:

fusing discrete statistic model format data for each time instant with discrete statistic model format data for a latter time instant after a predetermined time interval to update the discrete statistic model format data for the latter time instant, until the discrete statistic model format data for the first time instant is updated, such that the discrete part of the fused discrete statistic model format data comprises data of all discrete parts in the plurality of discrete statistic model format data, and based on the discrete part data of the fused discrete statistic model format data, computing the continuous data output format data for the curve corresponding to the discrete part data of the fused discrete statistic model format data as the continuous part of the fused discrete statistic model format data.

15. A vehicle, comprising:

one or more cameras, wherein the one or more cameras use one of a continuous model or a discrete model to represent an object, wherein the object includes a lanemarking characterized by a curve; and an apparatus as in claim 11.

16. The method of claim 6, further comprising:

removing duplicate data from all discrete parts in the plurality of discrete statistic model format data.

* * * * *